H. D. BOLTON.
COMBINED TYPE WRITING AND CALCULATING MACHINE.
APPLICATION FILED AUG. 21, 1907.

922,559.

Patented May 25, 1909.
6 SHEETS—SHEET 1.

Fig.1

Witnesses
Jas. H. McCathran
Louis G. Julihn

Herbert D. Bolton, Inventor
By C. G. Siggers
Attorney

H. D. BOLTON.
COMBINED TYPE WRITING AND CALCULATING MACHINE.
APPLICATION FILED AUG. 21, 1907.

922,559.

Patented May 25, 1909.
6 SHEETS—SHEET 5.

Witnesses
Jas. F. McCathran
Louis G. Julihn

Herbert D. Bolton, Inventor
By C. G. Siggers
Attorney

UNITED STATES PATENT OFFICE.

HERBERT D. BOLTON, OF NEW YORK, N. Y., ASSIGNOR TO ELLIOTT-FISHER COMPANY, OF NEW YORK, N. Y., A CORPORATION OF DELAWARE.

COMBINED TYPE-WRITING AND CALCULATING MACHINE.

No. 922,559.   Specification of Letters Patent.   Patented May 25, 1909.

Application filed August 21, 1907. Serial No. 389,563.

*To all whom it may concern:*

Be it known that I, HERBERT D. BOLTON, a citizen of the United States, residing at New York, in the county of New York and State of New York, have invented a new and useful Combined Type-Writing and Calculating Machine, of which the following is a specification.

This invention relates to combined type-writing and calculating machines, and more particularly of that class exemplified in Patent No. 820,879 issued to Laganke and Smith, May 15, 1906. In machines of the character specified a computing device is operated from the numeral keys of the type-writer simultaneously with the printing of the digits, the movement of the typewriter carriage serving to letter space the printing and to place the keys in coöperative relation with successive denominational members of the computing device. When the decimal space is reached, the carriage is automatically spaced thereover, so that when the carriage begins to move, after the printing of the last figure at the left of the decimal space, the carriage will advance more than the ordinary distance to insure the printing of the next digit at the right of the decimal space. This decimal spacing is accomplished automatically by what is known as decimal spacing mechanism fully described in the patent above identified, and obviously avoids the necessity for striking the space key when the decimal space is reached, and also avoids the possibility of erroneously printing a character in the decimal space instead of beyond the same. In machines of this character the keys are normally disconnected from the operating connections of the computing device, in order to permit the unrestricted independent use of the typewriter when writing outside of the column being computed. When, however, the printing point of the typewriter comes opposite the column, the keys are automatically connected with the computing device connections, and this connection is maintained as long as the carriage is in position to permit printing within the adding field, the automatic disconnection of the keys being effected when the carriage moves to a position which will permit printing outside of or beyond a column or field. One of the mechanisms for accomplishing this result is disclosed in the application for patent of John A. Smith, Serial No. 366,189. The Smith key connecting mechanism is normally ineffective to accomplish the automatic connection of the keys, so that, under normal writing conditions which do not contemplate the use of the adding mechanism, the keys will remain disconnected from such mechanism, thus permitting the unrestricted independent use of the typewriter, regardless of the location of the printing point of the machine. In other words, the keys remain disconnected during the entire travel of the carriage. The Smith mechanism is capable, however, of being set so that if, in the travel of the carriage, the printing point arrives opposite the column or adding field to which the computing device is appropriate the keys will be automatically connected with the adding mechanism to permit the simultaneous operation of the typewriting and adding mechanisms as long as the printing point of the machine is opposite the adding field.

My present invention relates more particularly to mechanism for controlling what has been described as the decimal spacing means, in a manner to render such means operative or inoperative, as desired, so that automatic decimal spacing may be secured or dispensed with at the will of the operator.

In a more restricted sense, the invention relates to a mechanism whereby both the decimal spacing mechanism and the key connecting mechanism will be automatically controlled by the manipulation of a single controlling member, which is operative to establish either of three conditions: first, to render both the decimal spacing means and the key connecting means ineffective so that neither the automatic connection of the keys nor the decimal spacing of the carriage will be effected; second, to render the decimal spacing mechanism effective without connecting the keys with the adding mechanism in order to secure decimal spacing of digits printed in the column or field to which the computing device is appropriate; third, to set or render operative both the decimal spacing means and the key connecting means so that when the carriage reaches the column or adding field, the keys will be automatically connected with the adding mechanism and the carriage automatically spaced over the decimal point of such column or field.

A preferred embodiment of the invention resides in that construction and arrangement of parts herein shown and described and succintly defined in the appended claims.

In the accompanying drawings.

Each part, wherever shown, is indicated by its proper reference character.

*The general organization of the typewriter.*—For the purpose of this disclosure, the invention is shown applied to the Elliott-Fisher billing machine of commerce. This machine is a flat platen typewriter equipped with adding mechanism. The typewriter is exemplified in Patent No. 573,868 to R. J. Fisher, and includes a flat platen 1 over which travels longitudinally thereof, for line spacing, a machine frame 2 on which is mounted a carriage 3 arranged to travel transversely of the platen for letter spacing. The carriage 3 supports printing mechanism 4 in the form of downwardly acting type-bars arranged to print upon a work sheet supported in a flat, spread-out condition on the platen 1. The printing mechanism is operated by letter and numeral keys 5 and 6 in a manner well understood in the art.

Figure 2:
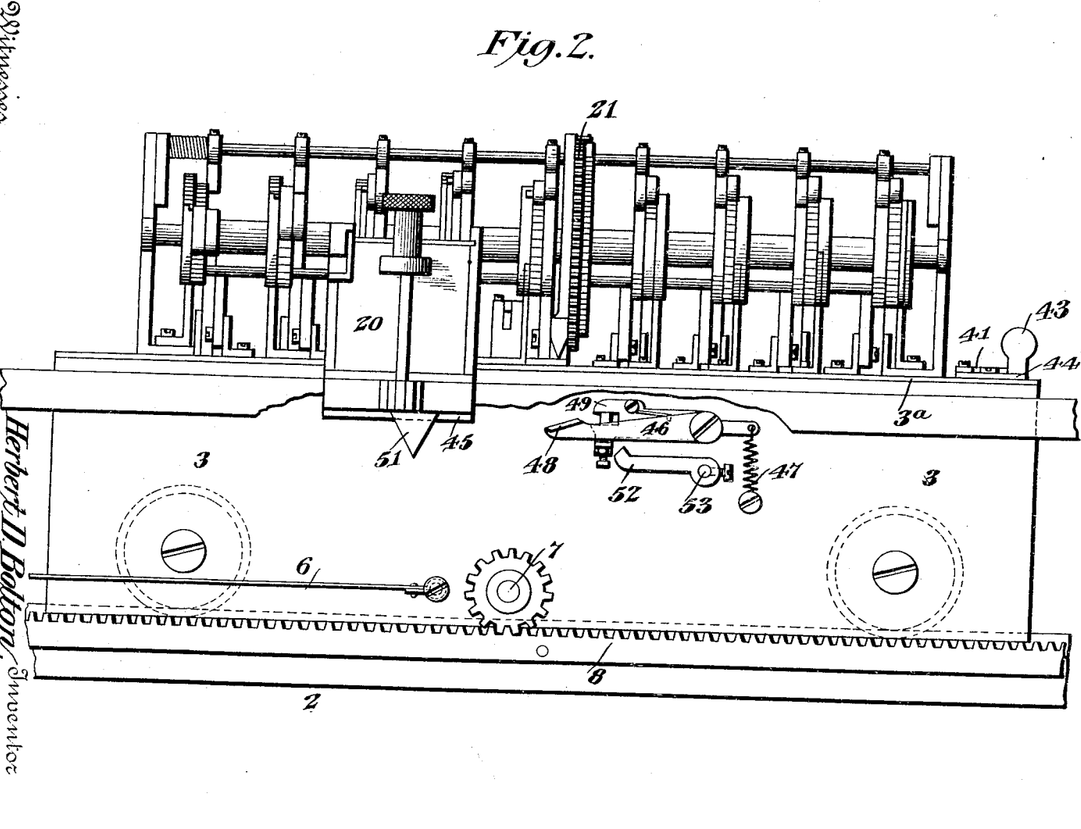
Fig. 2 is a rear elevation of a portion of the machine, designed more particularly to show exposed portions of the automatic key connecting and decimal spacing mechanisms.

The carriage 3 and the printing mechanism carried thereby is advanced to the right or in the direction of letter spacing by carriage propelling mechanism which includes spring drums, not shown, connected to the carriage by flexible tapes 6, one of which is indicated in Fig. 2.

*The carriage feeding mechanism.*—The letter space movement of the carriage 3 is controlled by carriage feeding mechanism fully described and shown in Patent No. 765,861 to John A. Smith. This mechanism includes a carriage feed spindle 7 rotatably mounted in the carriage 3 and geared to relatively fixed racks 8 carried by the frame 2, one of these racks being shown in Figs. 1 and 2. Since the spindle 7 necessarily advances with the carriage and rotates upon its own axis, the movement of the carriage is controlled by an escapement mechanism which controls the rotary movement of the spindle. This escapement mechanism involves, as disclosed in the Smith patent, an escapement wheel 9 fixed to the spindle, see Fig. 14, and coöperating with a pair of dogs 10 and 11 connected by links 12 and 13 to a vibrator 14. The dogs 10 and 11 are simultaneously swung in opposite directions by the movement of the vibrator 14 operatively connected to the keys by mechanism well understood in the art and including a link 15, a rock shaft 16 arranged to move the vibrator through the medium of the link, slides 17 movable to rock the shaft 16, and key yokes 18 operated by the keys of the typewriter to move the slides. The parts referred to are shown generally in Figs. 1 and 14, and it will be understood that upon the depression of a key, the vibrator 14 is swung in one direction and is moved in the opposite direction upon the release of the key by means of a spring 19 acting on the shaft 16 to retract the parts. In view of the fact that this carriage feeding mechanism is fully disclosed in the patent to Smith, above identified, it is only necessary to assert that the dog 10, which is known as the spacing dog, is normally in engagement with the escapement wheel 9 and prevents the rotation thereof and the consequent movement of the carriage. When a key is depressed, the vibrator 14 is rocked to withdraw the dog 10 from the ratchet wheel 9 and to move the other or holding dog 11 into engagement with the wheel, the engagement of the holding dog taking place before the disengagement of the spacing dog is complete. Thus, upon the depression of the key the dogs are shifted, but no appreciable movement of the ratchet wheel or carriage is permitted, the movement being merely such as will permit the spacing dog to engage the next succeeding tooth of the ratchet wheel when it is permitted to return to its engaging position upon the retraction of the key. It will thus be understood that when the key is permitted to retract, the holding dog 11 will move away from the wheel thus releasing the latter and permitting it to advance the distance of one tooth before it is engaged and held by the spacing dog 10. This operation of the escapement obviously results in a letter space movement of the carriage during the retraction of any key depressed.

*The adding mechanism.*—The adding mechanism of the Elliott-Fisher billing machine embraces a computing device or totalizer 20, mounted on the machine frame 2, and actuating mechanism therefor mounted on the carriage 3 and comprising a master wheel 21 and operating connections 22 operated from the numeral keys 6 to rotate the master wheel. While the specific character of the adding mechanism is not material, it may be stated that the computing device 20 embraces a series of denominational members or number wheels 23 and suitable carrying mechanism, not shown, whereby the value accumulated upon any wheel is transferred to the wheel of next higher order, as is usual in this class of devices. The computing device being mounted on the frame 2 is relatively fixed so that the master wheel 21, which moves with the carriage, is presented by the movement of the latter to successive number wheels from left to right or from higher to lower order, as the printing point of the typewriter moves to successive denominational positions across the column to be added. The master wheel therefore engages that number wheel which corresponds in denominational position to the denominational position of the printing point of the typewriter, and as the connections between the numeral keys 6 and the master wheel are such that the movement of the latter will correspond in extent to the value of the numeral key depressed, it follows that upon the depression of a key a digit will be printed in the column or adding field of the work sheet and the number wheel of corresponding denomination will be rotated to accumulate the value of such digit.

Included as elements of the operating connections of the computing device are slotted links 24, which are movable into and out of engagement with the stems of the numeral keys 6, a separable connection between the links and key stems being provided, as indicated at 25. The links 24 are normally in disengaged position so that the numeral keys, when printing digits outside of the adding field, are not burdened either by the computing device or any of the operating connections thereof. For the purpose of swinging the links 24 into engagement with the keys to operatively connect the latter with the operating mechanism, a yoke 26 is provided, see Figs. 1, 3 and 4. This yoke is suspended from the cover-plate 3ª of the carriage and is rocked back and forth to control the connection of the keys.

The mechanism described under the last heading has only been described in general for the purpose of facilitating a complete comprehension of the utility of the mechanism with which the invention is more directly concerned. For a more complete disclosure of the computing device and its operating connections, reference is made to Patents Nos. 820,877 and 829,971 to Laganke and Smith.

*The automatic key connecting mechanism.*—This class of machines are commonly equipped with automatic mechanism for connecting the keys and adding mechanism when the adding field or column is reached in the progress of the carriage, so that while the numeral keys are unburdened by the adding mechanism when printing outside of the column, the connection of the keys with said mechanism will be insured whenever the machine is arranged to print in the column to be added. In Patent No. 856,318, to Patrick H. Turley is shown one form of automatic key connecting mechanism wherein provision is made for setting such mechanism in effective or ineffective position, so that it may be rendered effective or ineffective to cause the automatic connection of the keys when the master wheel moves opposite the register, or in other words, when the printing point of the typewriter moves opposite that portion of the work sheet which constitutes the adding field, provided the machine is set to add when that field is reached. The same character of automatic key connecting mechanism is shown in the pending application of John A. Smith, Serial No. 366,189, hereinbefore identified, and since the particular mechanism devised by Smith is best adapted for the purposes of the present invention, I have disclosed in the accompanying drawings the Smith connecting mechanism modified somewhat in accordance with my present purpose.

Figures 10, 11, 12, 13:
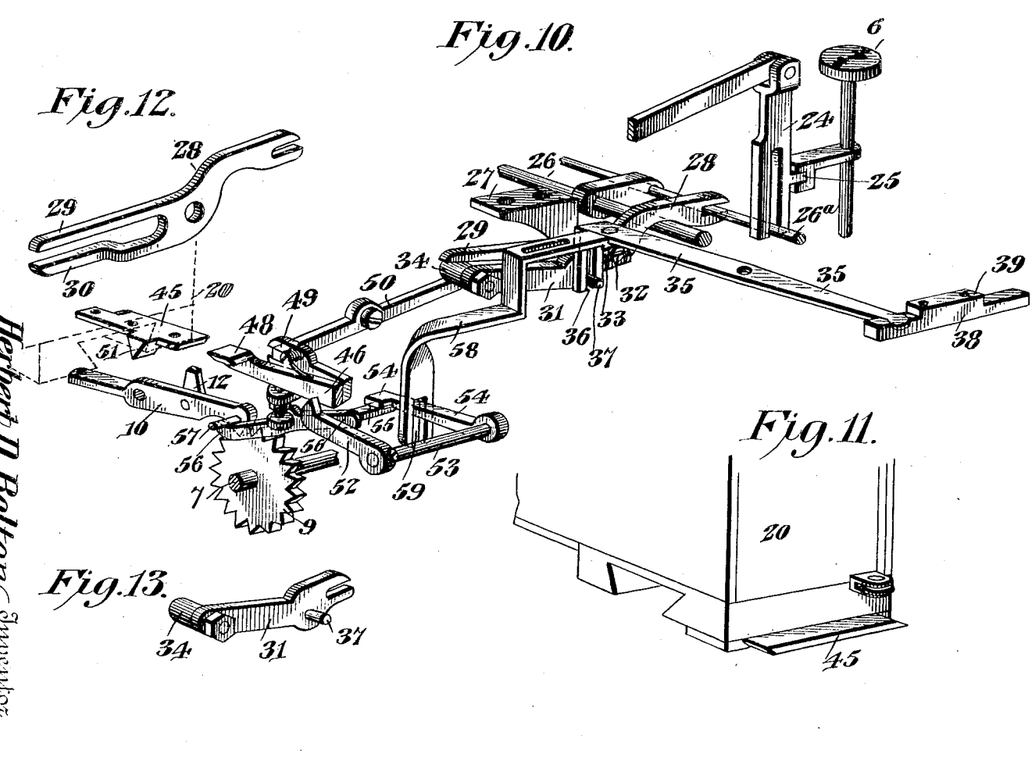
Fig. 10 is a perspective view of the mechanism with which my invention is most directly concerned, the parts being shown detached, in order to facilitate a more comprehensive idea of the relations of the various operating parts which contribute to the several novel ends specified.
Fig. 11 is a detail perspective view of a portion of the computing device or register equipped with certain elements of the key connecting and decimal spacing mechanism.
Fig. 12 is a detail view of the yoke operating lever.
Fig. 13 is a similar view of the setting plate.

Substantially midway of the cover-plate 3ª depends a bracket 27 to which is fulcrumed a yoke-operating lever 28, see particularly Figs. 10 and 12. The front end of the lever 28 is bifurcated to engage a rod 26ª of the yoke 26, which, as before stated, normally occupies a position from which it may be swung to present the several links 24 in engagement with the numeral key stems. The rear end of the lever 28 is bifurcated to form upper and lower arms 29 and 30, the latter being deflected laterally in order to present the arms in different vertical planes. On the left hand face of the lever 28 is mounted an abutment plate 31 slidable longitudinally of the lever 28 and guided by a headed stud 32 projecting from the lever at a point above and somewhat in advance of its fulcrum and engaging a slot 33 in the plate. The abutment plate 31 is provided with an abutment having the form of a roller 34, extended laterally from the plate and disposed between the arms 29 and 30 of the lever 28. The abutment 34 normally occupies an inoperative position, to-wit, the position shown in full lines in Fig. 4, but is adapted to be set in the operative position shown in Fig. 10, by means of setting mechanism which shifts the abutment plate 31 to move the abutment 34 back to the rear end of the lever 28 to the position shown in Fig. 10 and also shown in dotted lines in Fig. 3. In this operative position of the abutment 34 it may be engaged by operating mechanism which, through the medium of said abutment, swings the lever 28 to shift the links 24 into engagement with the key stems, the positions of the parts shown in Fig. 10 being those assumed when the mechanism is operated to effect this purpose, to-wit, the connection of the keys with the adding mechanism.

The mechanism whereby the abutment plate 31 is shifted comprises a setting lever 35 fulcrumed on the under side of the plate 3ª and having an angular slotted end 36 which engages a pin 37 extended from the abutment plate in substantially the horizontal plane of the fulcrum of the yoke operating lever 28. The opposite end of the setting lever 35 is connected to a slide 38 preferably adjacent to one end of the cover-plate at the under side thereof and having a projection 39 extended through a slot 40 in the plate. Above the cover-plate 3ª an upper indicator-plate 41 is secured to the projection 39 of the slide and is provided with an opening 42 and with a key or finger piece 43 by means of which latter the slide is shifted in order to swing the setting lever 35 and thus move the abutment 34 to its set or unset position, accordingly as it is desired to render the automatic key connecting mechanism effective or ineffective.

Through the opening in the plate 41, suitable indications are visible in different positions of the plate for the purpose of indicating the position of the slide and the condition of the mechanism. These indications may be suitably imprinted or otherwise displayed on the cover-plate of the carriage, but by preference a lower indicator-plate 44, provided with suitable indications, is secured to the plate 3ª in a position subjacent to the upper indicator plate 41.

The mechanism which operates the abutment 34 to effect the connection of the keys with the adding mechanism is operated through the movement of the typewriter carriage. This mechanism includes a cam plate 45 extended across the front of the computing device or register 20 and coacting with a swinging arm 46 mounted on the back of the carriage casing, see Figs. 2 and 10. The arm 46 is yieldingly retained by a spring 47 in such position that a lug 48 on said arm will engage the beveled end of the cam plate 45 as the carriage advances, and continued movement of the carriage causes the arm to be depressed and to be held depressed by the plate as long as the printing point of the carriage is crossing the adding field.

Coacting with the arm 46 and depressed thereby, is a second arm 49, the end of which is in engagement with an intermediate lever 50 the front end of which underlies the abutment 34 in the operative or set position of the latter. Therefore, if the abutment is in set position, the depression of the arm 46 by the cam plate 45 will cause the intermediate lever 50, by engagement with an abutment 34, to elevate the rear end of the yoke operating lever 28, thus depressing the front end of the lever and swinging the yoke 26 forwardly to swing the links 24 into engagement with the keys. If the abutment 34 is in its unset or ineffective position, it will be removed from coöperative relation with the intermediate lever 50, and therefore the depression of the arm 46 when the printing point moves across the adding field or column, will not transmit motion to the lever 28 and the keys will remain disconnected. The retraction of the carriage will in no event effect any operation of the mechanism, except that the arm 46 will be elevated idly as the lug 48 travels idly back above the plate 45.

The mechanism described under the last heading is substantially that shown in the Smith application, modified slightly as follows: In accordance with the Smith invention, the setting mechanism, to-wit, the slide 38 and the parts connected thereto, is shiftable alternately to either of two positions, to-wit, the set or unset positions known as the "add" or "total" positions, the sole purpose of the Smith mechanism being to control the connection of the keys with the adding mechanism, the automatic connection being effected when the parts were set to add, and the keys remaining disconnected when the parts were set to total, so that the keys will always be connected to the adding mechanism during the addition of the column and will remain disconnected when it is desired to print a total at the foot of a column without operating the adding mechanism.

The Smith mechanism as modified by me is capable of movement to three set positions, instead of two, that is to say the slide 38 may be moved to either of three distinct positions, designated as the adding, total printing, or writing positions, the lower indicator plate 44 being accordingly equipped with the three indications, "add," "total," and "write" as shown in Figs. 5, 6, 7, and 9. The first two of these positions correspond with the positions to which the Smith setting mechanism is adjustable. The third position, to-wit the "writing" position, merely necessitates slight elongation of the slotted connection between the lever 28 and the plate 31, so that the slide 38 may be moved rearwardly from the "total" position, which is the rearmost position of the slide in the Smith construction. This will be clear by reference more particularly to Figs. 3 and 4. The setting mechanism is shown in dotted lines in Fig. 3 in the first or "add" position, the abutment being in effective or coöperative relation with both the yoke operating lever 28 and the intermediate lever 50, see also Fig. 10. The "total" position of the setting mechanism is shown in Fig. 4, the abutment 34 being moved forward to an ineffective position, to-wit, out of coöperative relation with the lever 50. The third or "write" position is shown in full lines in Fig. 3, the abutment 34 remaining in ineffective position, but being moved forward somewhat farther from the lever 50. It will thus be seen that this third position of the slide 38 has no material effect, so far as the automatic key connecting mechanism is concerned, since the parts already set to ineffective position are merely moved to another position which is also ineffective and which maintains their ineffectiveness. The purpose of this third or extended movement of the slide will presently appear.

*The decimal spacing mechanism.*—I now come to the consideration of still another common characteristic of the Elliott-Fisher billing machine and the one with which my present invention is most closely identified. In this machine provision is made for automatically effecting decimal spacing, that is to say, the carriage is caused to skip over the decimal space without attention on the part of the operator. Such mechanism is described in Patent No. 820,879 to Laganke and Smith, the desired end being attained by providing a trip or tooth on the register, which, when the decimal point is reached, engages a mechanism which momentarily retards the movement of the spacing dog into engagement with the ratchet of the escapement, this momentary retardation of the dog serving to permit the wheel, and therefore the carriage, to move the distance of two teeth or two letter spaces instead of one before the carriage is arrested by the engagement of the ratchet and dog. This portion of the mechanism under consideration is similar to that described in the patent aforesaid, with such modifications as are necessitated by the different form of escapement here shown, and by the special end in view, to-wit, to render the decimal spacing mechanism ineffective under certain conditions.

Figure 1:
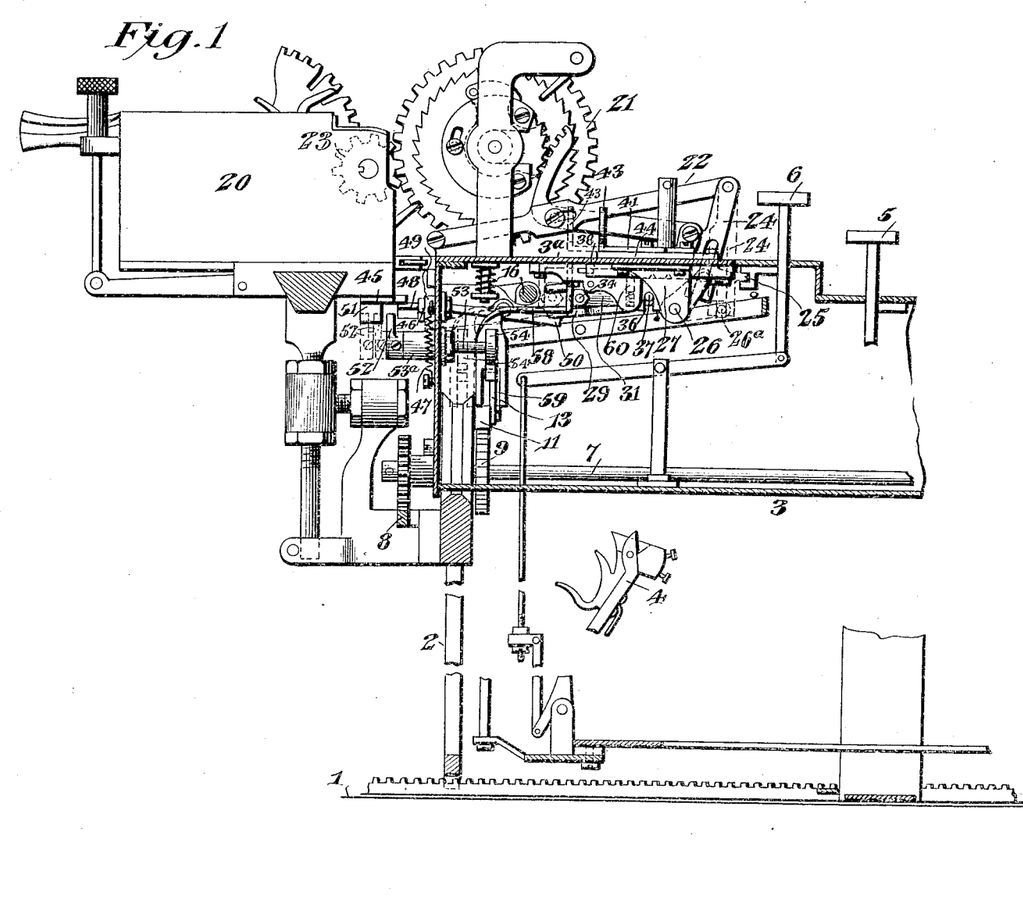
—Figure 1 is a vertical sectional view through so much of an Elliott-Fisher billing and adding machine as is necessary to show the application of my invention thereto.
Figure 14:
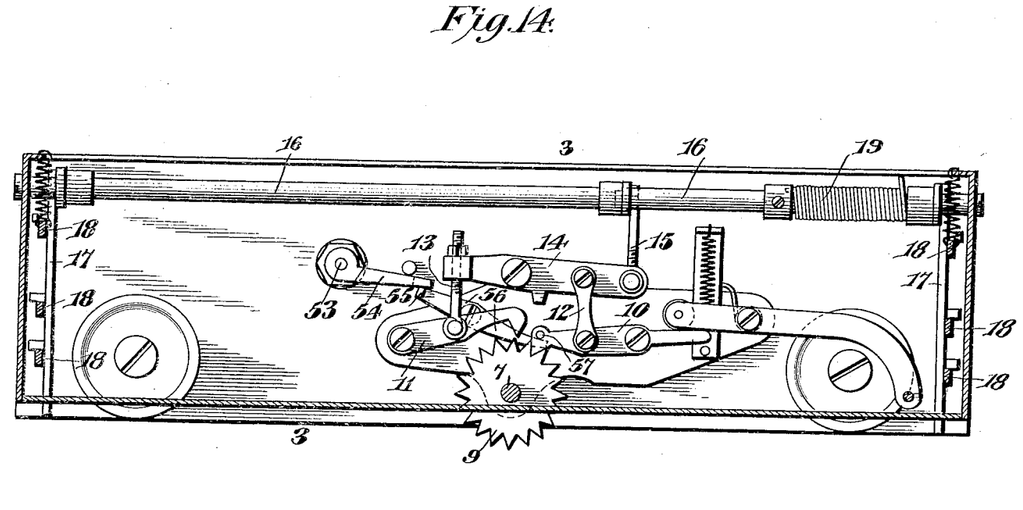
Fig. 14 is a sectional view of the carriage casing showing the relation of the carriage feed mechanism and the decimal spacing mechanism.

Pendent from the register 20 is a pointed tooth 51 which constitutes a decimal spacing trip or cam. Arranged to coöperate with this trip is a trip arm 52 carried at the rear end of a rock shaft 53 which extends through the rear wall of the carriage casing, as shown in Fig. 1, and rotates within a sleeve bearing 53ᵃ carried by said wall. To the front end of the rock shaft 53 is secured an arm 54 which bears at its free end upon an arm or lug 55 projecting forwardly from the left hand end of what may be termed a dog retarding lever 56, fulcrumed intermediate of its ends upon the back wall of the carriage casing, as shown at Fig. 14, and extended under a pin 57 projecting rearwardly from the normally engaged dog 10 of the typewriter escapement.

When a key has been depressed to print in the units position, the dog 10 is moved away from the escapement wheel and the dog 11 is moved into engagement therewith, as heretofore described. Upon the release of the key, the dog 11 moves away from the escapement wheel, thus releasing the latter and permitting the carriage to feed, and the normal tendency of the dog 10 is to move back into engagement with the wheel to arrest the carriage at the next letter space position. At this particular time, however, that is, when the carriage is moving from the units position, the pointed or cam end of the trip arm 52 engages the trip 51 and is depressed thereby. This depression of the trip arm rocks the shaft 53 and depresses the arm 54 which in turn depresses the left hand end of the retarding lever 56 and causes the latter, by engagement with the pin 57, to momentarily retard the retractile movement of the dog 10. This retardation of the dog is just sufficient to allow the ratchet wheel of the escapement to move the distance of two teeth and the carriage to move the distance of two letter spaces before the dog engages the wheel and thus arrests the movement of the carriage. This exaggerated or double movement of the carriage causes the printing point of the machine to be automatically spaced over the decimal space, that is to say, the carriage moves directly from the units to the tenths position, without necessity for striking the space key.

*The means for rendering the decimal spacing mechanism effective or ineffective at*

*will.*—I have already stated that the idea of effecting automatic decimal spacing is not original with me. Heretofore, however, the decimal spacing mechanism has been effective at all times and has had no connection whatever with the automatic key connecting means. Therefore, whenever the trip arm 52 has been brought in contact with the trip 51, the movement of the carriage has been exaggerated and a double space has been effected. This is desirable during addition with the keys connected to the adding mechanism, and is also desirable in printing the total, with the keys disconnected. It sometimes happens, however, that it is desirable to have ordinary printed matter extend across the work sheet, either above or below the column or even between two columns located one under another. The automatic spacing of the carriage during the printing of such matter is objectionable and results in the improper spacing of the printed matter, unless the computing device is removed from its operative position and the trip 51 thus removed from coöperative proximity to the arm 52. It is the primary object of the present invention to provide means for rendering the decimal spacing mechanism effective or ineffective at the will of the operator, and a secondary object is to provide a single means for controlling both the decimal spacing mechanism and the key connecting mechanism. The arrangement is such that by the manipulation of a single key both the decimal spacing mechanism and the key connecting mechanism may be set to act automatically at the proper time, as for instance, when it is desired to print and add a column of numbers; or, the decimal spacing mechanism may be set to act automatically and the key connecting mechanism rendered inoperative, as for instance when it is desired to write a total; or, both the decimal spacing mechanism and the key connecting mechanism rendered inoperative to permit the unrestricted independent use of the typewriter for writing in the ordinary manner without operating the adding mechanism and without automatic decimal spacing.

To the right hand end of the setting lever 35 is secured the front end of a shifting rod 58, the rear end of which is forked, as indicated at 59, to engage the arm 54 of the decimal spacing mechanism. Attention is now directed to the fact, see particularly Fig. 1, that the bearing 53ª is considerably shorter than the rock shaft 53. This enables the shaft to be shifted longitudinally to three different positions by the shifting rod 58, which, being connected with the lever 35, necessarily moves with the latter as the key 43 is shifted to the "add," "total" or "write" positions, it being noted that the lug 55 of the retarding lever 56 is of sufficient length to maintain engagement with the free end of the arm 54 in all positions of the latter.

In modifying the construction in accordance with my present invention, I have widened the decimal spacing trip 51 so that when the trip arm 52 is shifted to either the "add" or "total" position, it will remain opposite the trip, to be operated thereby for the purpose of automatically effecting decimal spacing during the addition, and also during the printing of the total. This will be understood by reference to the width of the trip 51 and the two dotted positions of the arm 52 in Fig. 1. When, however, the arm 52 is shifted to the "write" position, shown in full lines in Fig. 1, see also the full line positions of certain of the parts in Fig. 3, the arm 52 will be out of line with the trip 51, and the decimal spacing mechanism will thus be rendered ineffective, since the arm will not come into contact with the trip, but will move past the same in advance thereof, and this avoid automatic spacing of the carriage during the writing of matter not requiring exaggerated or decimal spacing.

*The controlling means for the key connecting and decimal spacing mechanisms.*— Attention is now directed to the fact that the key 43 serves to control or set in effective or ineffective condition both the automatic key connecting mechanism and the automatic decimal spacing mechanism. This end results from the fact that the lever 35 operated by said key serves to shift the abutment 34 of the automatic key connecting mechanism into and out of operative position and likewise serves, through the medium of the shifting bar 58, to shift one of the coöperating elements, to-wit, the arm 52 of the automatic decimal spacing mechanism, into and out of operative position.

Figure 3:
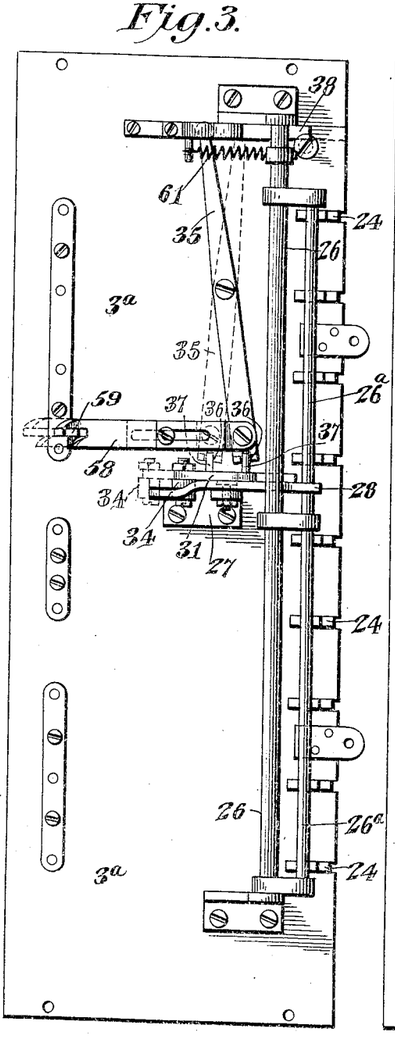
Fig. 3 is an inverted plan view of the cover-plate of the carriage showing two positions of the mechanism carried thereby, the full line positions of the parts being those assumed when the mechanism is set to "write", with both the automatic key connecting and decimal spacing mechanisms inoperative, and the dotted positions of the parts being those assumed when the machine is set to "add", with both the key connecting and the decimal spacing mechanisms set or in condition to operate when the adding field is reached.
Figure 4:
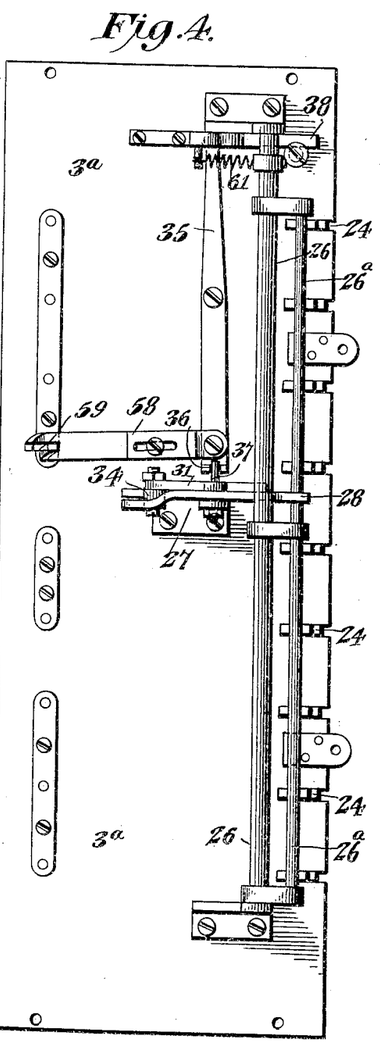
Fig. 4 is a view similar to Fig. 3, showing the parts in an intermediate position known as the "total" position, the decimal spacing mechanism alone being set for automatic action so that in printing the total at the foot of the column the keys will remain disconnected from the adding mechanism, while automatic decimal spacing may, nevertheless, be effected.
Figure 5:
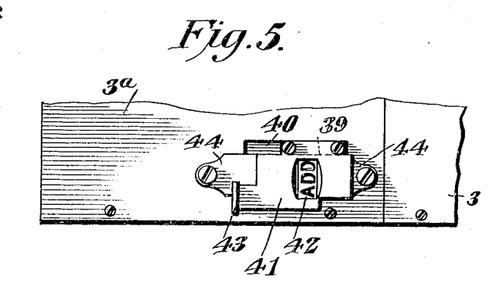
Figs. 5, 6 and 7 are detail views, showing the three positions of the total or setting key and the indicator coöperating therewith.
Figure 6:
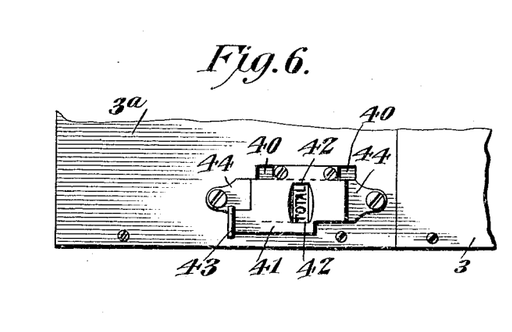
Figure 7:
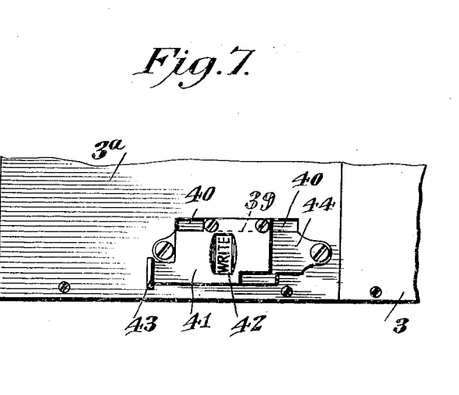
Figures 8, 9:
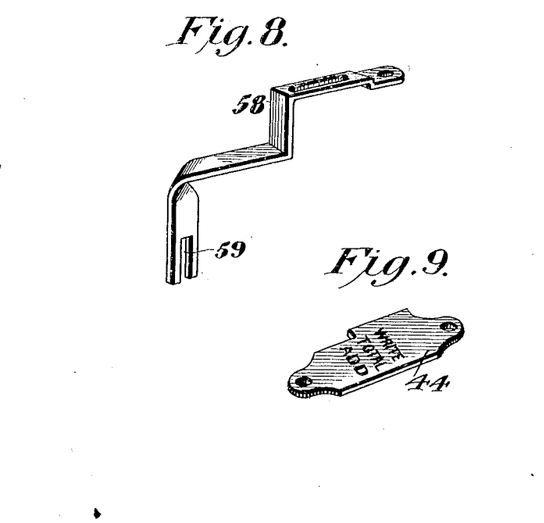
Fig. 8 is a detail perspective view of the shifting rod.
Fig. 9 is a detail perspective view of the lower indicator plate.

To recapitulate briefly, the machine is normally set for use merely as a typewriting machine, the key 43 being in the "write" position, shown in Fig. 7, the decimal spacing mechanism being ineffective, and the adding mechanism being disconnected from the keys, as shown in Fig. 1; see also the full line positions of the parts in Fig. 3. This is one extreme position of the key, to-wit, its rearmost position. If now, it is desired to use the machine as a combined typewriting and adding machine, the key 43 is shifted to its other extreme position, to-wit, the "add" position, shown in Fig. 5. This manipulation will set both the automatic key connecting mechanism and the automatic decimal spacing mechanism for subsequent automatic operation to connect the keys and adding mechanism when the adding field is reached and to automatically space the carriage over the decimal point of such field. When the addition is complete and it is desired to print the total at the foot of the column, the key 43 is moved to its intermediate or total position, indicated in Fig. 6. This manipulation serves to render the automatic key connecting mechanism ineffective, but allows the automatic decimal spacing mechanism to remain set, so that when the carriage moves over to the adding field to write the total, the keys will remain disconnected, but the decimal spacing mechanism will automatically act to properly space the digits printed.

A yielding detent 60, similar to that disclosed in the Smith application, is employed to retain the slide 38 in either of its three positions, and the usual yoke retracting spring 61 is employed to retract the yoke and thus disconnect the keys when the cam 48 passes beyond the cam plate 45.

It is thought that from the foregoing, the construction and operation of the described mechanism will be fully understood, but I wish to expressly reserve the right to effect such changes, modifications, and variations of the illustrated structure as may come fairly within the scope of the protection prayed.

What I claim is:—

1. The combination with a platen and printing mechanism, relatively movable, of means controlling such movement for normal spacing, automatic decimal spacing mechanism operative to cause decimal spacing of the platen and printing mechanism at a given point in the relative travel of said platen and printing mechanism, and means for rendering the decimal spacing mechanism operative or inoperative.

2. The combination with a platen and printing mechanism, relatively movable, of means for controlling such movement for normal spacing, automatic decimal spacing mechanism operative to cause decimal spacing of the platen and printing mechanism at a given point in the relative travel of said platen and printing mechanism, and means for determining whether or not the automatic decimal spacing mechanism will be operated, said means including a key.

3. The combination with a computing device and actuating mechanism therefor, relatively movable to change their denominational relation, of means for effecting relative step-by-step movement of the computing device and its actuating mechanism and including means for exaggerating such movement at the proper point to accommodate the decimal space, and means for rendering the decimal spacing means ineffective.

4. The combination with a computing device and actuating mechanism therefor, of means for causing relative step-by-step movement of the computing device and its actuator to change the denominational relation thereof, means for exaggerating such movement when the decimal space is reached, and means including a key for determining whether or not the decimal spacing means shall operate to cause exaggerated spacing.

5. The combination with a movable carriage, of an escapement mechanism operative repeatedly to control the normal step-by-step movement of said carriage, means automatically brought into action by the movement of the carriage at a predetermined point in its advance to exaggerate the normal operation of the escapement and thus permit the exaggeration of one step or movement of the carriage, and a device whereby the operation of said exaggerating means may be controlled.

6. In a combined typewriting and adding machine, the combination with a typewriter including a platen and printing mechanism, relatively movable, numeral keys, and an escapement operated by the keys and controlling the relative step-by-step movement of the platen and printing mechanism, of adding mechanism including a computing device or register and operating mechanism therefor, the denominational relation of the computing device and its operating means being controlled by the relative movement of the platen and printing mechanism of the typewriter and said operating mechanism being under the control of the typewriter keys, decimal spacing mechanism operative to cause an exaggerated relative movement of the platen and printing mechanism to accommodate the decimal space, and means including a key for rendering the decimal spacing mechanism effective or ineffective.

7. The combination with a typewriter including a carriage, keys, and printing mechanism, of adding mechanism, automatic means operative to cause a connection to be established between the typewriter keys and the adding mechanism, automatic decimal spacing mechanism operative to exaggerate the normal movement of the carriage to accommodate the decimal space, and controlling means common to both the key connecting means and the decimal spacing means.

8. In a combined typewriting and adding machine, the combination with a typewriter, including a carriage, keys, printing mechanism, and carriage feeding mechanism, of adding mechanism arranged to be operated upon the depression of the numeral keys of the typewriter, key connecting means automatically operated to cause a coöperative relation to be established between the keys and the adding mechanism at a predetermined point in the movement of the carriage, automatic decimal spacing means brought into action by the movement of the carriage to cause the same to space or skip over the decimal space, and mechanism including a key for determining whether the key connecting means and the decimal spacing means shall operate.

9. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic decimal spacing means operative to space the carriage over the decimal point, and setting mechanism common to both the key connecting means and the decimal spacing means.

10. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic decimal spacing means operative to space the carriage over the decimal point, and a setting key common to both the key connecting means and the decimal spacing means.

11. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic decimal spacing means operative to space the carriage over the decimal point, and means for rendering both the key connecting mechanism and the decimal spacing mechanism either operative or inoperative.

12. In a combined typewriter and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the computing mechanism when the adding field is reached, automatic decimal spacing means operative to space the carriage over the decimal point, and means for rendering both the key connecting means and the decimal spacing means operative or for rendering one only of said means operative.

13. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic decimal spacing means operative to space the carriage over the decimal point, and setting mechanism common to both the key connecting means and the decimal spacing means and movable to different positions to produce either of three conditions, to-wit, to render both the key connecting means and the decimal spacing means operative, to render both of said means inoperative, or to render one of said means operative and the other inoperative.

14. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic decimal spacing means operative to space the carriage over the decimal point, and setting means common to both the key connecting means and the decimal spacing means, said setting means being movable to different positions in one of which both the key conecting means and the decimal spacing means will be operative, in another of which both of said means will be inoperative, and in still another of which the decimal spacing means will be operative and the key connecting means inoperative.

15. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic decimal spacing means operative to space the carriage over the decimal point, said key connecting means being arranged to be set in effective or ineffective condition and said decimal spacing means also being arranged to be set in effective or ineffective position, and means whereby the decimal means will be set in operative condition by the setting of the key connecting means in such condition.

16. In a combined typewriting and calculating machine, the combination with a typewriter including a carriage, keys, printing mechanism, and carriage feeding mechanism, of adding mechanism arranged to be operated from the numeral keys of the typewriter, automatic key connecting means operative to connect the keys with the adding mechanism when the adding field is reached, automatic spacing means operative to space the carriage over the decimal point, and setting mechanism common to both the key connecting means and the decimal spacing means and including a key operative to set both the key connecting means and the decimal spacing means for automatic operation, said key being also operative to render one only of said means inoperative.

In testimony, that I claim the foregoing as my own, I have hereto affixed my signature in the presence of two witnesses.

HERBERT D. BOLTON.

Witnesses:
JOHN A. SMITH,
EDWARD M. WINTERS.